US006601750B2

(12) United States Patent
Palladino et al.

(10) Patent No.: US 6,601,750 B2
(45) Date of Patent: Aug. 5, 2003

(54) INTEGRATED CLAMPING AND CLINCHING DEVICE, PARTICULARLY FOR JOINING SHEET-METAL PANELS AND THE LIKE

(75) Inventors: Francesco Palladino, Turin (IT); Giancarlo Alborante, Turin (IT)

(73) Assignee: Comau Spa, Grugliasco (IT)

( * ) Notice: Subject to any disclaimer, the term of this patent is extended or adjusted under 35 U.S.C. 154(b) by 28 days.

(21) Appl. No.: 10/024,029

(22) Filed: Dec. 21, 2001

(65) Prior Publication Data

US 2002/0185522 A1 Dec. 12, 2002

(30) Foreign Application Priority Data

Jun. 7, 2001 (IT) .................................... TO2000A0659

(51) Int. Cl.[7] ........................ B23K 37/053; B23Q 3/06; B23Q 7/04; B21D 22/00

(52) U.S. Cl. ..................... 228/44.3; 228/212; 29/283.5; 72/352

(58) Field of Search ................................ 228/212, 213, 228/44.3, 49.4; 72/352, 379.2; 29/283.5, 432, 432.1, 432.2, 505, 509, 512, 521, 522.1, 243.5

(56) References Cited

U.S. PATENT DOCUMENTS 3,862,485 A * 1/1975 Hafner ........................ 29/521
4,208,776 A * 6/1980 Schleicher ................. 29/243.5
4,416,046 A * 11/1983 Stokes ......................... 29/417
4,799,611 A * 1/1989 Taga ........................... 227/18
4,866,825 A * 9/1989 Suzuki ....................... 29/33.2
4,905,362 A * 3/1990 Obrecht et al. ............ 29/243.5
5,230,136 A * 7/1993 Cronn et al. .................. 29/521
5,251,502 A * 10/1993 Eisbrenner et al. ........... 74/110
5,315,743 A * 5/1994 Schleicher ................. 29/243.5
5,517,743 A * 5/1996 Liebig et al. ................. 29/521
5,528,815 A * 6/1996 Webb .......................... 29/509
5,806,362 A * 9/1998 Dubugnon ............... 72/453.04
5,884,386 A * 3/1999 Blacket et al. ............. 29/522.1
5,992,206 A * 11/1999 Kuhne ......................... 72/395
6,115,898 A * 9/2000 Sawdon ..................... 29/243.5
6,398,096 B1 * 6/2002 Lang ........................... 227/51

FOREIGN PATENT DOCUMENTS

EP 000545240 A1 * 6/1993

OTHER PUBLICATIONS

US 2002/0162211A1 Sawdon (Nov. 7, 2002).*
US 2002/0033569A1 Watanabe (Mar. 21, 2002).*
US 2003/0037428A1 Wang et al. (Feb. 27, 2003).*
US 2002/0185522A1 Palladino et al. (Dec. 12, 2002).*

* cited by examiner

*Primary Examiner*—Tom Dunn
*Assistant Examiner*—Kiley Stoner
(74) *Attorney, Agent, or Firm*—Sughrue Mion, PLLC

(57) ABSTRACT

Described herein is an integrated clamping and clinching device for sheet-metal panels which simultaneously performs a clamping operation on two or more panels in the precise assembly condition, and application of at least one clinching point for obtaining joining of the panels. The device is provided with at least one pair of clamping elements and at least one pair of clinching elements which are controlled by one and the same fluid cylinder in such a way that the pair of clamping elements reaches a closed position immediately before the pair of clinching elements.

5 Claims, 3 Drawing Sheets

INTEGRATED CLAMPING AND CLINCHING DEVICE, PARTICULARLY FOR JOINING SHEET-METAL PANELS AND THE LIKE

TEXT OF DESCRIPTION

The present invention relates to the field of techniques for assembling motor-vehicle bodies or parts thereof. According to the prior art, assembly of motor-vehicle bodies or of sub-assemblies of said bodies is performed by means of spot welding of sheet-metal panels. Again according to the prior art, spot welding is performed by means of welding guns having respective welding electrodes that engage on opposite sides the sheet-metal panels that are to be welded. Welding is performed while the panels are clamped in the precise assembly position by means of clamping devices. Once again according to the prior art, the said clamping devices have a supporting structure, at least one first clamping element and one second clamping element that are carried by the supporting structure and can move with respect to one another between an open position and a closed position, in which they are designed to clamp together two or more sheet-metal panels, and a fluid cylinder mounted on the supporting structure for controlling the relative movement of the two clamping elements between their open position and their closed position.

In recent times, it has been, on the other hand, proposed to carry out assembly of the panels partially overlapping one another by means of the clinching technique, basically consisting in pressing the two panels, for instance, between a die and a clinching punch which permanently deform the panels in such a way as to obtain connection thereof. The advantage of clinching as compared to electric welding lies in a greater simplicity and smaller overall dimensions of the corresponding equipment, as well as in a longer working life of the clinching punches with respect to the welding electrodes, which, particularly in the case of galvanized sheet metal, involve waste of time on account of the need to replace them after a relatively limited number of cycles. As regards clinching punches, instead, these may have a working life in the region of 250 000 cycles, without requiring any maintenance operations.

The purpose of the present invention is to enable a rational and economically advantageous application of the clinching process to the assembly of panels, and in particular of sheet-metal panels forming part of a motor-vehicle structure.

With a view to achieving the above purpose, the subject of the present invention is a clamping device of the type specified above, comprising a supporting structure, at least one first clamping element and one second clamping element that are carried by the supporting structure and can move with respect to one another between an open position and a closed position, in which they are designed to clamp together two or more panels, and a fluid cylinder mounted on the supporting structure for controlling the relative movement of said first and second clamping elements, the said clamping device being moreover characterized in that it also comprises at least one first clinching element and at least one second clinching element, which are carried by the aforesaid supporting structure and can move with respect to one another between an open position and a closed position, in which they are designed to carry out clinching of the panels clamped between said first and second clamping elements, and control means for controlling movement of said first and second clinching elements.

Consequently, the device according to the invention constitutes an integrated clamping and clinching unit that is able to perform both the clinching operation and the operation of clamping of the sheet-metal panels that are to undergo clinching.

In a preferred embodiment, the aforesaid means for controlling movement of the first clinching element and second clinching element consist of the same fluid cylinder that controls the first and second clamping elements, and further comprise a mechanical transmission that operatively connects one of said clamping elements, which is mobile with respect to the other clamping element, to one of said clinching elements, which is mobile with respect to the other clinching element, in such a way that, following upon activation of said fluid cylinder, the two clamping elements reach their closed position before the aforesaid clinching elements reach their closed position.

The device according to the invention is therefore able to carry out the clamping operation and the clinching operation simultaneously in a rational and economically advantageous way, using the same control cylinder, preferably a pneumatic cylinder, for actuating both the clamping elements and the clinching elements.

The unit according to the invention affords the advantages of greater simplicity and smaller overall dimensions as compared to known devices which use, on the one hand, equipment that only performs clamping of the sheet metal and, on the other, electric-welding guns with the corresponding accessories (power-supply transformer, power-supply cables, etc.). Furthermore, as has already been said, the clinching elements have a considerably longer life than spot-welding electrodes.

The possibilities of application of the invention are general, both as regards bodies of motor vehicles or sub-assemblies thereof and as regards any other structure made of panels assembled together. Of course, the clinching operation affords, as compared to the spot-welding operation, also the advantage of enabling joining of panels made of metals that are not easy to weld together or of panels made of metal material and panels made of plastic material.

In a concrete embodiment, a plurality of devices of the type specified above are used for carrying out tacking of a motor-vehicle structure or of a sub-assembly thereof, namely for performing application of a minimal number of joining points that makes it possible to bestow a relatively stable geometry on the structure, after which the structure itself is finally assembled by spot welding which, however, can be performed without having to clamp the components of the structure in a precise assembly position, since the said position has been already ensured by the previous tacking step carried out by means of the devices according to the invention.

Further characteristics and advantages of the present invention will emerge from the ensuing description, with reference to the attached drawings, which are provided purely by way of non-limiting example and in which.

Figure 1:
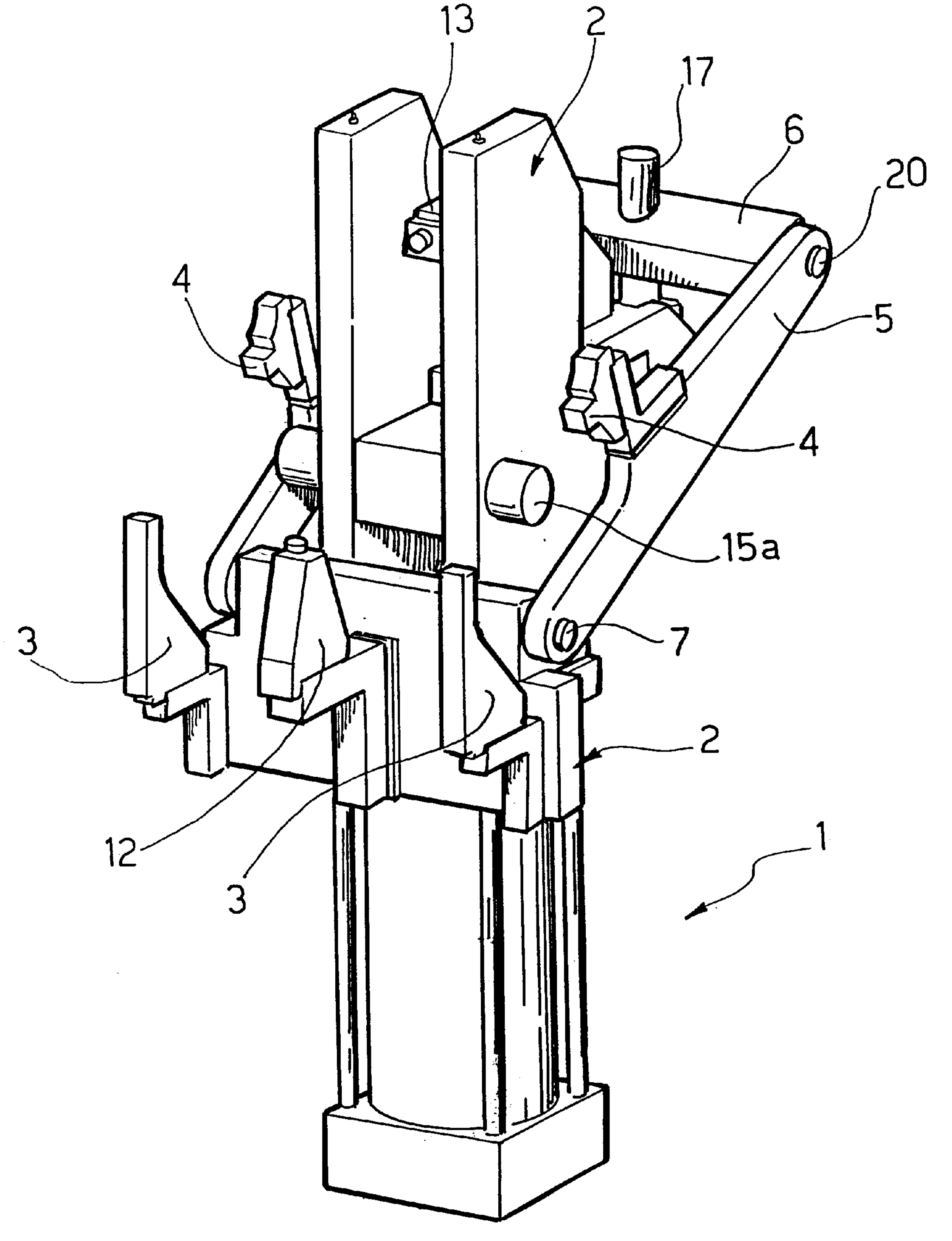
FIG. 1 is a perspective view of an embodiment of the device according to the invention in its open condition.
Figure 2:
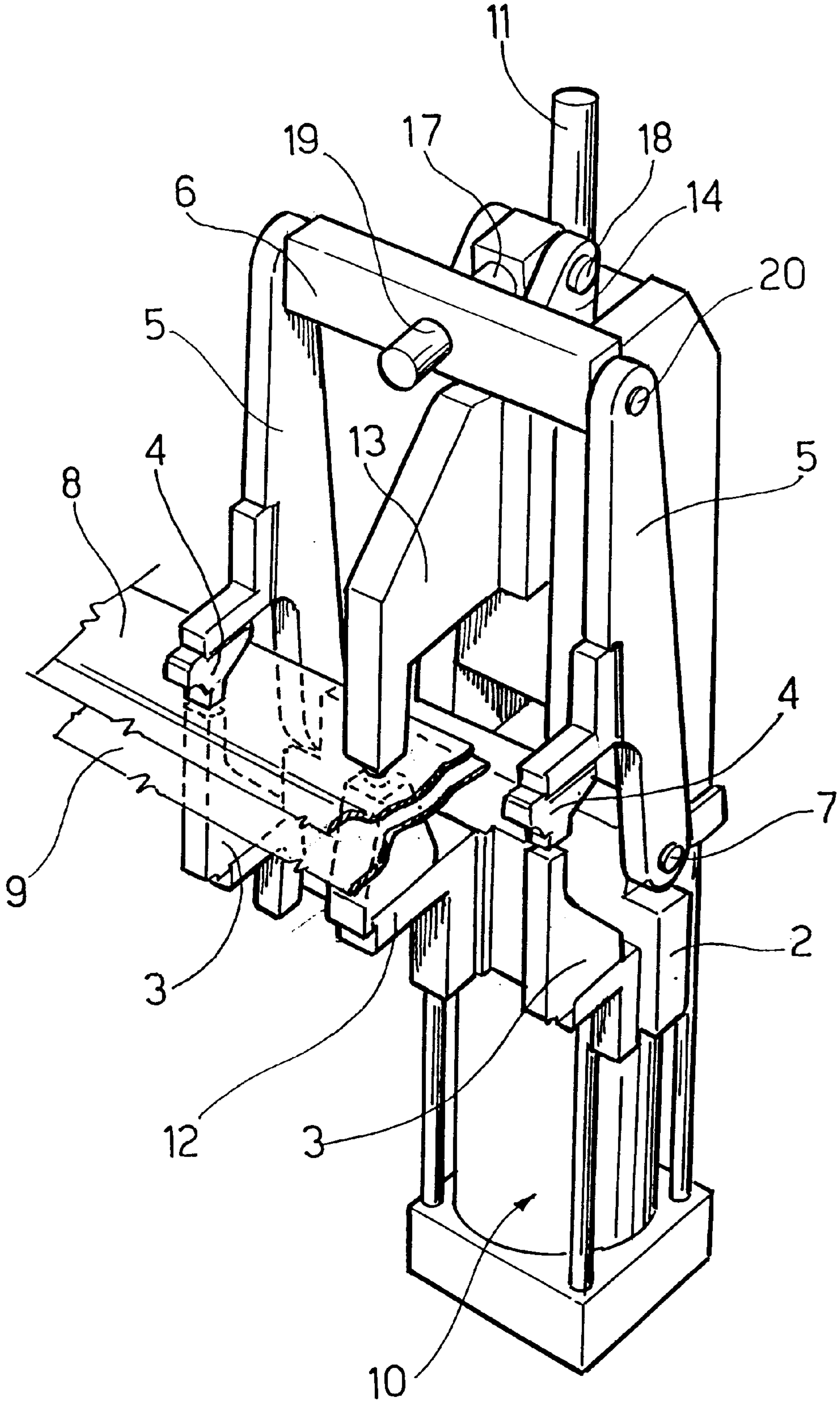
FIG. 2 is a perspective view of the device of FIG. 1 in its closed condition.
Figure 3:
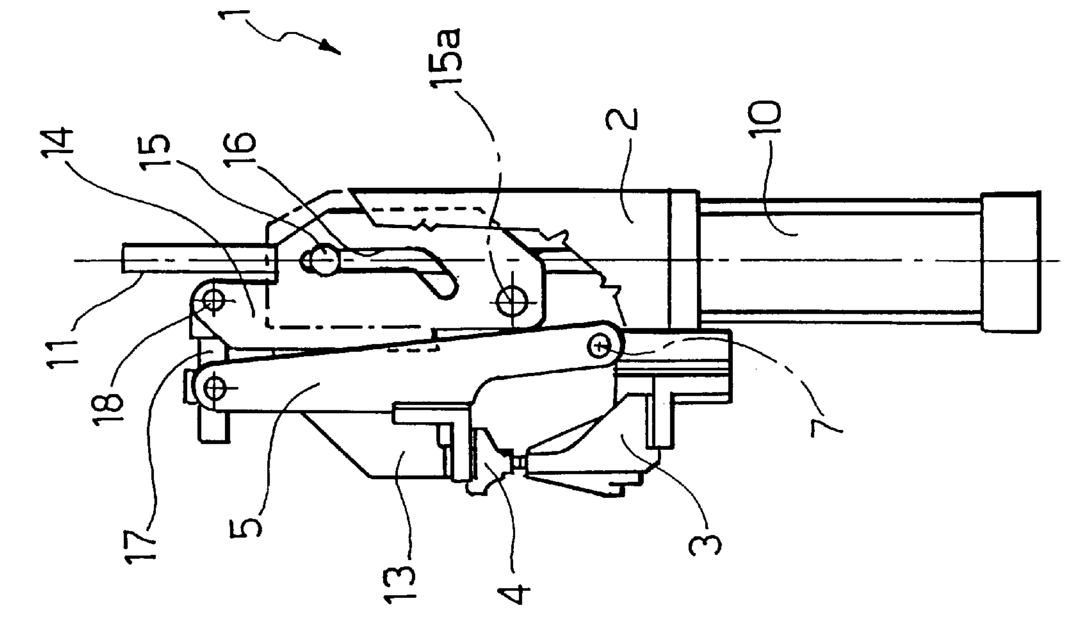
FIG. 3 is a partially sectioned side view of the device in the condition of FIG. 2.

With reference to FIGS. 1–3, number 1 designates, as a whole, an integrated device for clamping and clinching sheet-metal components of a motor-vehicle body or of a sub-assembly thereof. The device 1 comprises a supporting structure 2, which carries two first clamping elements 3, rigidly connected to the structure 2, and two second clamping elements 4, cooperating with the first clamping elements 3 and carried by two arms 5, which are rigidly connected together by means of a cross member 6 and are articulated to the supporting structure 2 about an axis 7. The structure made up of the two arms 5 of the cross member 6, with the second clamping elements 4 fixed to the latter, can move between an open position (FIG. 1), in which the elements 4 are at a distance from the elements 3, and a closed position (FIG. 2), in which the two pairs of clamping elements 3, 4 are designed to clamp between them two elements 8, 9 made of sheet metal (see FIG. 2). Movement of the structure consisting of the two arms 5 with the cross member 7 between the closed position and the open position is controlled by a pneumatic cylinder 10, the body of which is fixed to the supporting structure 2 and the stem of which controls the aforesaid movement in the way that will be described in the sequel.

In the device according to the invention there is also integrated a pair formed by a first clinching element 12 and a second clinching element 13, which co-operate together in such a way as to bring about, according to a technique in itself known, permanent deformation of the two sheet-metal panels 8, 9 that are pressed between them. For this purpose, also the clinching elements 12, 13 can be displaced between a closed condition and an open condition. In particular, in the case of the example illustrated, the first clinching element 12 is fixed and is rigidly connected to the supporting structure 2, whilst the second clinching element 13 can move between a closed condition and an open condition. In particular, the element 13 is connected to an arm 14 which is supported, in such a way that it can turn about an axis 15 (FIG. 3), by the supporting structure 2. Movement of the mobile clinching element 13 between a closed position and an open position is controlled by the stem 11 of the fluid cylinder 10 by means of any transmission of a known type. In the case of the example illustrated, the said transmission consists of a pin 15 carried by the stem 11, which engages a shaped slit 16 made in the element 14.

In addition, the element 14 is connected to the structure made up of the two arms 5 and the cross member 6 by means of a pin 17 (FIG. 3) which is articulated in 18 to the element 14 and which engages a hole 19 made in the cross member 6. The latter is articulated about an axis 20 with respect to the arms 5 to enable simultaneous rotation of the arms 5 of the element 14 about their respective axes 7, 15 during the manoeuvre of closing the device. The connection transmission between the element 14 and the arms 5 is such that, when the fluid cylinder brings about closing of the device, the two pairs of clamping elements 3, 4 reach their closed position, where they grip the sheet-metal panels, immediately before the clinching elements 12, 13 act on the panels to carry out clinching. Upon completion of the operation, the device can be opened again to perform a new operation on a different piece or in a different area of the structure.

Figure 4:
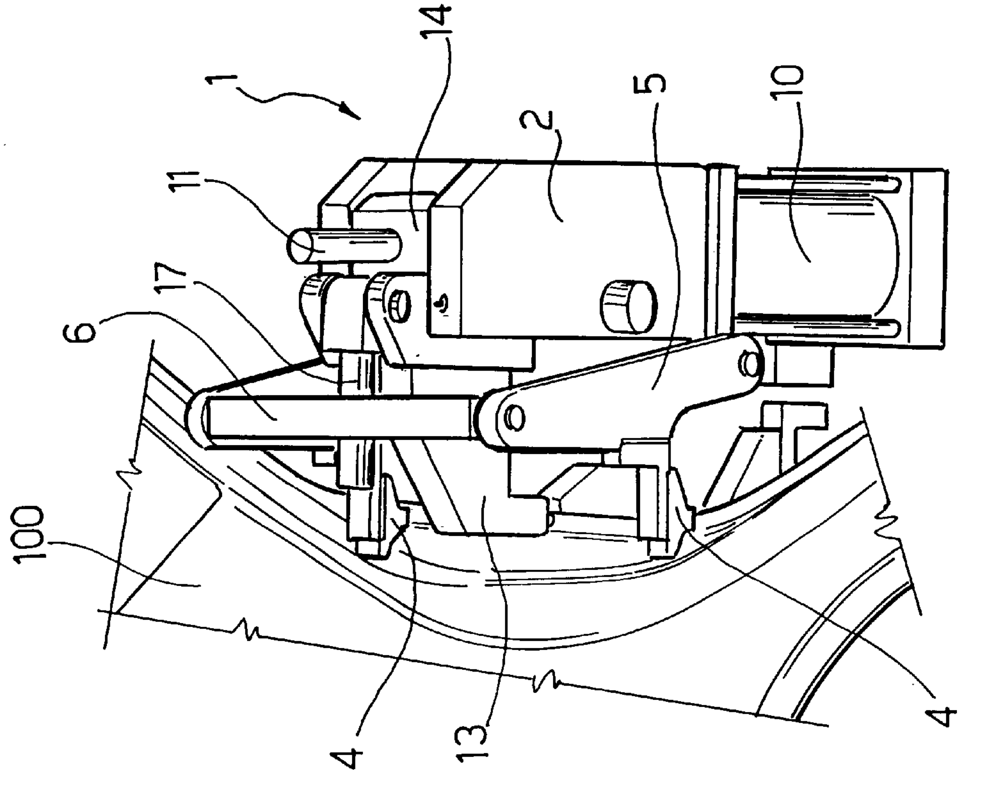
FIG. 4 is a perspective view illustrating the application of the device according to the invention for joining the components of a motor-vehicle structure.

FIG. 4 of the annexed drawings illustrates, by way of example, the device 1 according to the invention operating on a portion of the door compartment of a motor-vehicle body 100.

As illustrated previously, it is possible to use a plurality of integrated clamping and clinching devices of the type referred to above to carry out tacking in a motor-vehicle body in order to confer a relatively stable geometry on the latter, so that final assembly of the body can be carried out by applying additional welding spots, without, however, there being any need to provide devices for clamping the structure, in view of the fact that the body that has undergone tacking has a sufficiently stable geometry.

Of course, without prejudice to the principle of the invention, the details of construction and the embodiments may vary widely with respect to what is described and illustrated herein purely by way of example, without thereby departing from the scope of the present invention.

What is claimed is:

1. A clamping device for clamping sheet-metal panels or the like, comprising:

a supporting structure;

at least one first clamping element and one second clamping element that are carried by the supporting structure and can move with respect to one another between an open position and a closed position, in which they are designed to clamp together two or more panels; and a fluid cylinder mounted on the supporting structure for controlling the relative movement of said first and second clamping elements, wherein said device also comprises at least one first clinching element and at least one second clinching element, which are carried by the supporting structure and can move with respect to one another between an open position and a closed position, in which they are designed to carry out clinching of the panels clamped between said first and second clamping elements and control means for controlling movement of said first and second clinching elements.

2. The integrated clamping and clinching device according to claim 1, wherein said means for controlling relative movement of the first clinching element and second clinching element consist of the same fluid cylinder that controls the first and second clamping elements, and of a mechanical transmission that operatively connects one of said clamping elements, which is mobile, to one of said clinching elements, which is mobile.

3. The integrated clamping and clinching device according to claim 1, wherein said mechanical transmission comprises a rod-type connection between an articulated arm that carries the mobile clamping element and an articulated arm that carries the mobile clinching element; said articulated arms being mounted so they can oscillate on the fixed supporting structure about respective axes.

4. The integrated clamping and clinching device according to claim 3, wherein two pairs of clamping elements are provided that include two first clamping elements, which are fixed and rigidly connected to the supporting structure, and two second clamping elements, which are carried by respective articulated arms mounted in such a way that they can oscillate on the supporting structure about the aforesaid axis of oscillation.

5. The integrated clamping and clinching device according to claim 4, wherein the aforesaid fluid cylinder has a stem which directly controls the aforesaid arm that carries the second clinching element.

* * * * *

UNITED STATES PATENT AND TRADEMARK OFFICE

CERTIFICATE OF CORRECTION

PATENT NO. : 6,601,750 B2
DATED : August 5, 2003
INVENTOR(S) : Giancarlo Alborante and Francesco Palladino It is certified that error appears in the above-identified patent and that said Letters Patent is hereby corrected as shown below:

Title page,
Item [30], Foreign Application Priority Data, delete "Jun 7, 2001" insert
-- July 6, 2001 --

Signed and Sealed this

Twelfth Day of October, 2004

JON W. DUDAS
*Director of the United States Patent and Trademark Office*